United States Patent
Lundkvist et al.

(10) Patent No.: US 11,224,827 B2
(45) Date of Patent: Jan. 18, 2022

(54) LAYERED CHROMATOGRAPHY COLUMN CYLINDER

(71) Applicant: Cytiva Sweden AB, Uppsala (SE)

(72) Inventors: Mats Lundkvist, Uppsala (SE); Daniel Salomonsson, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 60 days.

(21) Appl. No.: 16/348,581

(22) PCT Filed: Nov. 10, 2017

(86) PCT No.: PCT/EP2017/078965
§ 371 (c)(1),
(2) Date: May 9, 2019

(87) PCT Pub. No.: WO2018/087339
PCT Pub. Date: May 17, 2018

(65) Prior Publication Data
US 2019/0275446 A1  Sep. 12, 2019

(30) Foreign Application Priority Data
Nov. 11, 2016 (GB) ...................... 1619083

(51) Int. Cl.
*B01D 15/22* (2006.01)
*B32B 1/08* (2006.01)
(Continued)

(52) U.S. Cl.
CPC ............... *B01D 15/22* (2013.01); *B32B 1/08* (2013.01); *B32B 3/06* (2013.01); *B32B 7/12* (2013.01);
(Continued)

(58) Field of Classification Search
CPC ...... B01D 15/22; B01D 15/206; B01D 15/10; B01D 15/08
See application file for complete search history.

(56) References Cited

U.S. PATENT DOCUMENTS 6,029,498 A   2/2000 Walters et al.
7,373,073 B2  5/2008 Kamp et al.
(Continued)

FOREIGN PATENT DOCUMENTS

CN  101004409 A  7/2007
CN  105413233 A  3/2016
(Continued)

OTHER PUBLICATIONS

Kwon et al. "Effects of Prepolymerized Particle Size and Polymerization Kinetics on Volumetric Shrinkage of Dental Modeling Resins" (BioMed Research International, Article ID 914739, vol. 2014, Mar. 17, 2014) (Year: 2014).*

(Continued)

*Primary Examiner* — Ryan B Huang
(74) *Attorney, Agent, or Firm* — Eversheds-Sutherland (US) LLP

(57) ABSTRACT

Disclosed is a chromatography column cylinder (200) formed from a polymer composite comprising an outer layer (220) and inner layer (210) intended to be in direct contact with the intended contents of the cylinder in a volume (202), wherein the outer layer supports the inner layer, for example when there is negative pressure in the volume (202). In one embodiment, one of said layers is molded directly onto a surface of the other layer such that there is no gap between the two layers. Disclosed also is a method for forming a chromatography column cylinder.

13 Claims, 3 Drawing Sheets

(51) Int. Cl.
*B32B 3/06* (2006.01)
*B32B 7/12* (2006.01)
*B32B 27/08* (2006.01)
*B32B 27/30* (2006.01)
*B32B 27/32* (2006.01)
*B32B 37/12* (2006.01)
*B32B 37/18* (2006.01)
*G01N 30/60* (2006.01)
*G01N 30/02* (2006.01)

(52) U.S. Cl.
CPC ............ *B32B 27/08* (2013.01); *B32B 27/308* (2013.01); *B32B 27/32* (2013.01); *B32B 37/12* (2013.01); *B32B 37/182* (2013.01); *G01N 30/6052* (2013.01); *G01N 30/6073* (2013.01); *B32B 2250/02* (2013.01); *B32B 2250/246* (2013.01); *B32B 2307/54* (2013.01); *B32B 2307/714* (2013.01); *B32B 2323/10* (2013.01); *B32B 2333/12* (2013.01); *G01N 2030/027* (2013.01)

(56) References Cited

U.S. PATENT DOCUMENTS

| | | | |
|---|---|---|---|
| 7,811,451 | B2 | 10/2010 | Nagaoka et al. |
| 2004/0035774 | A1* | 2/2004 | Horsman ............ G01N 30/6073 210/198.2 |
| 2009/0001007 | A1 | 1/2009 | Shimizu et al. |
| 2011/0114559 | A1* | 5/2011 | Fislage ................. B01D 53/22 210/648 |
| 2012/0024411 | A1* | 2/2012 | Hahn ................. G01N 30/6073 138/109 |
| 2012/0322983 | A1 | 12/2012 | Shirataki et al. |
| 2015/0122365 | A1 | 5/2015 | Carr et al. |
| 2015/0166987 | A1 | 6/2015 | Craighead et al. |
| 2016/0325204 | A1* | 11/2016 | Peyser ................. B01D 15/206 |

FOREIGN PATENT DOCUMENTS

| | | |
|---|---|---|
| CN | 205301261 U | 6/2016 |
| JP | 2007-064725 A | 3/2007 |
| JP | 2009216586 A | 9/2009 |
| WO | 2004/081557 A1 | 9/2004 |
| WO | 2012/021596 A1 | 2/2012 |

OTHER PUBLICATIONS

Silikas et al. "Influence of P/L ratio and peroxide/amine concentrations on shrinkage-strain kinetics during setting of PMMA/MMA biomaterial formulations" (Biomaterials, 26, p. 197-204, 2005) (Year: 2005).*
PCT International Search Report and Written Opinion for PCT Application No. PCT/EP2017/078965 dated Jan. 30, 2018 (10 pages).
Great Britain Search Report for GB Application No. 1619083.7 dated May 12, 2017 (4 pages).
Great Britain Search Report for GB Application No. 1619083.7 dated Jun. 28, 2017 (2 pages).
Chinese Office Action for CN Application No. 201780069827.X dated Jan. 28, 2021 (30 pages with English translation).

* cited by examiner

LAYERED CHROMATOGRAPHY COLUMN CYLINDER

CROSS REFERENCE TO RELATED APPLICATIONS

This application claims the priority benefit of PCT/EP2017/078965 filed on Nov. 10, 2017 which claims priority benefit of Great Britain Application No. 1619083.7, filed Nov. 11, 2016. The entire contents of which are hereby incorporated by reference herein.

TECHNICAL FIELD

The present invention relates to the construction of components for chromatography columns used for liquid chromatographic separation, and methods of the construction of such components.

BACKGROUND

Chromatography column assemblies (herein: columns) used for liquid chromatography have the function of separating, the constituents of an analyte mixture in suspension, for example compounds, proteins, or other matter in liquid suspension. Known columns comprise a volume to enclose liquids in use, the volume including a carrier liquid (often called mobile phase) mixed with a porous separation media (often called stationary phase). Substantial separation of constituents in a mixture added to one end of the volume takes place as the analyte mixture progresses through the porous media carried by the carrier liquid.

Prior to any separation process, the bed has to be prepared starting from a suspension of the separation media that has to be introduced into the column The process of bed formation is called 'packing procedure' and is especially critical for packed beds. A packed bed is typically formed by consolidating a suspension of the media particles. For example, the bed can be compressed used a piston arrangement—known as an adapter plate, such that excess carrier liquid is removed. The goal of this procedure is to provide a bed of ideal homogeneity. Large scale columns are preferably prepared by injecting a slurry of media particles through a central slurry nozzle. The excess liquid during this procedure is removed at the column outlet, while the particles are retained by means of a filter material, a so-called 'bed support'. The process is complete once the packed bed has filled the desired volume in the chromatographic column. The packing process is considered as being successful if the homogeneity and stability of the packed bed allows for a good and robust chromatographic performance quantified in terms of the residence time distribution over the bed.

Column packing, chromatographic separation, and column emptying put significant stresses on the column, resulting from both fluid pressure above and below ambient pressure. Such stresses are particularly evident in automated techniques used during packing, separation, and emptying of columns So, the correct construction of the column is extremely important. To avoid distortion of a band of separated analyte mixture constituents, known columns have a uniform cross sectional area so the column construction usually includes a right circular cylinder having flat ends which incorporate inlets and outlets. In that way constituents progress through the bed from end to end without experiencing any cross-sectional area changes. Even though it would be possible to form the column wholly from metals such as stainless steel, it is preferred to use some metal components at the ends of column, but transparent materials for the column cylinder: glass for small volume separations (<1 liter column volume); or acrylic plastics (Poly methyl methacrylate—PMMA) for medium to large volume separations (>1 liter). Transparent materials are important when manual procedures are undertaken, and afford a visual confirmation of progress, when procedures are automated. PMMA has excellent mechanical strength and can be made transparent and so PMMA is widely used for column cylinders.

However, when PMMA is used for the column cylinder, the composition of the carrier liquids and the analyte suspension liquids has to be carefully considered. Many solvents are absorbed or partially absorbed by PMMA, leaving surface crazing in the PMMA which affects the mechanical strength of the column cylinder, and so the chromatographic performance achievable is reduced to negate the risks of cylinder stress failure.

Another consideration is cost, both material costs and fabrication costs. PMMA has a cost which compares favorably with stainless steel or other materials, particularly for larger diameters of cylinders. So, using PMMA is desirable from a cost perspective also. Materials such as polycarbonate have good mechanical strength but have, in general terms no better chemical resistance than PMMA.

Yet another consideration is sterility and ease of cleaning the column. Simple construction with no dead spaces where liquids collect has proved to be the best option for cleaning and sterilizing the columns between production runs. So, parts which are manufactured as separate pieces and are held together mechanically, even with no apparent gap between them, can collect liquid which is difficult to clean without disassembly.

Thus, the ideal column cylinder has excellent chemical resistance and excellent mechanical strength, but is inexpensive to construct. In addition, a column cylinder which is formed as one component provides a more readily cleanable product. The inventors are not aware of column which addresses wholly the above-mentioned needs.

SUMMARY OF THE INVENTION

The inventors present herein embodiments which address the problems mentioned above.

According to an aspect of the invention, there is provided a chromatographic separation column cylinder constructed as claimed in claim 1 or as claimed in claim, optionally including features of dependent claims.

According to yet another aspect of the invention, there is provided a method of construction of a chromatographic column cylinder as claimed in claim 9, optionally including features of claims dependent on claim 9.

More advantages and benefits of the present invention will become readily apparent to the person skilled in the art in view of the detailed description below.

DRAWINGS

The invention will now be described in more detail with reference to the appended drawings, wherein:

FIG. 2a shows a partial enlargement of the end of the cylinder shown in FIG. 2;

Figure 2:
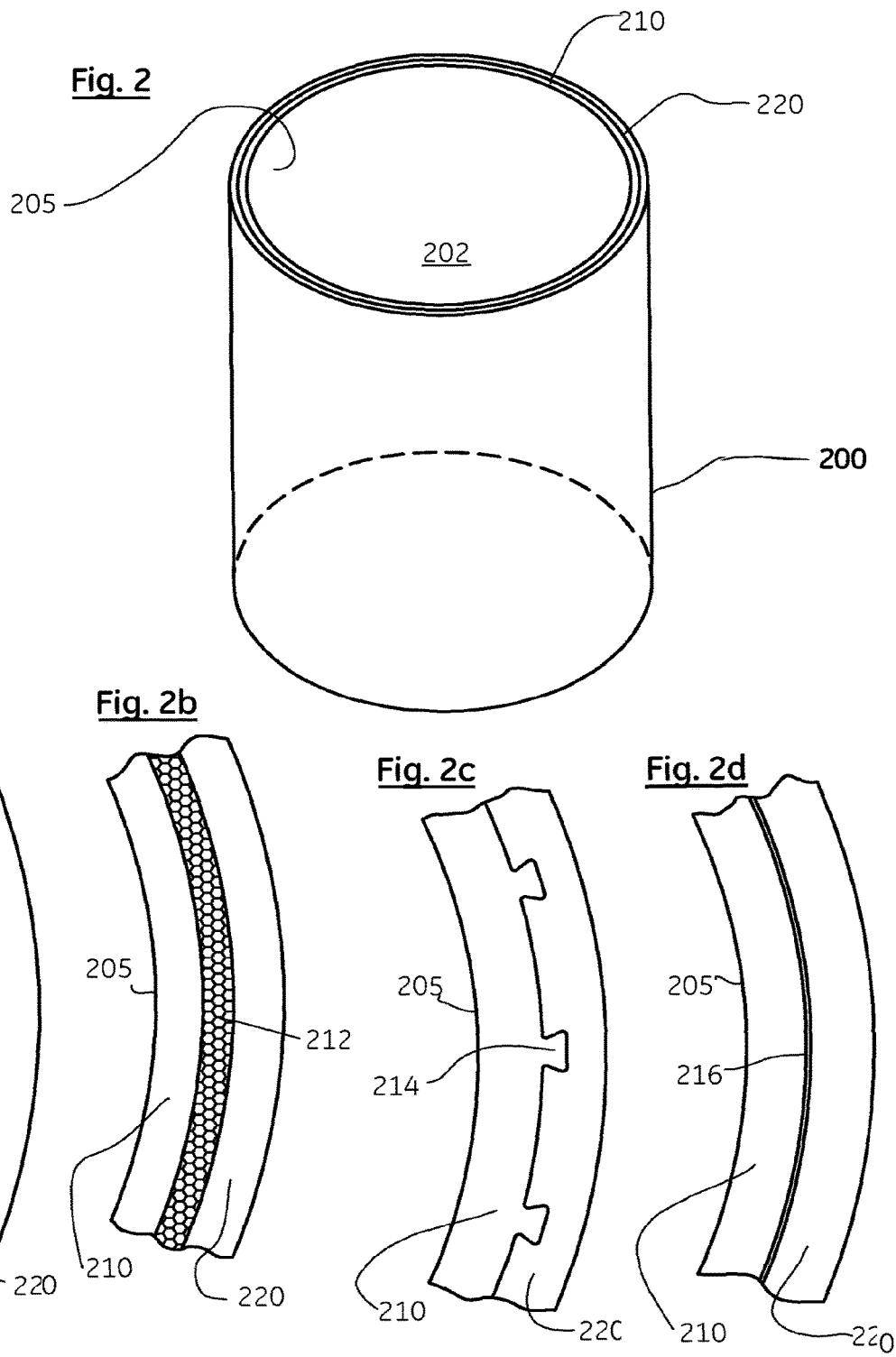
FIG. 2 shows a column cylinder used in the assembly of FIG. 1.

FIGS. 2b, 2c and 2d each show a variant of the cylinder shown in FIG. 2; and

Figure 3:
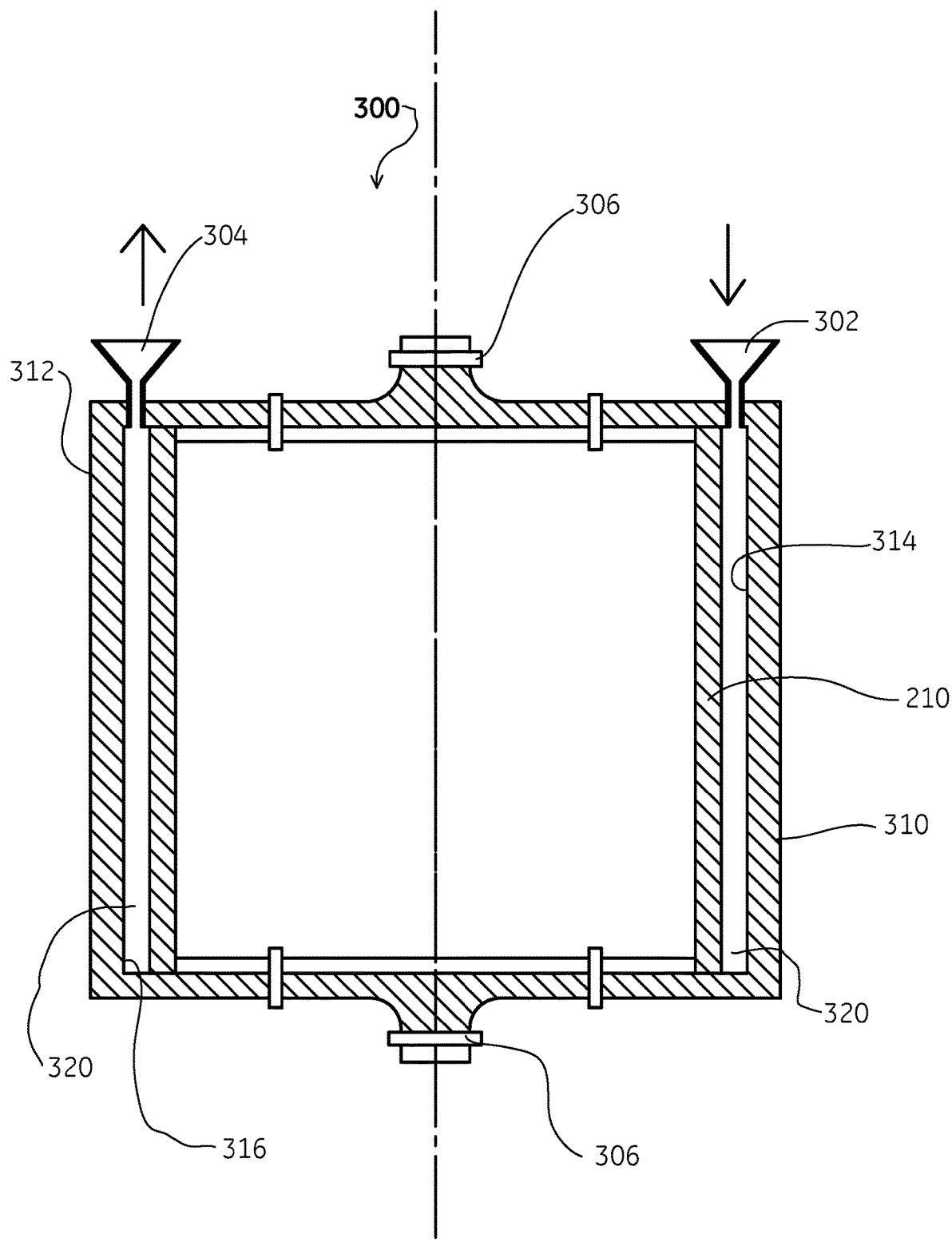

FIG. 3 shows a constructional technique for manufacturing the column cylinder shown in FIG. 2.

DETAILED DESCRIPTION

Figure 1:
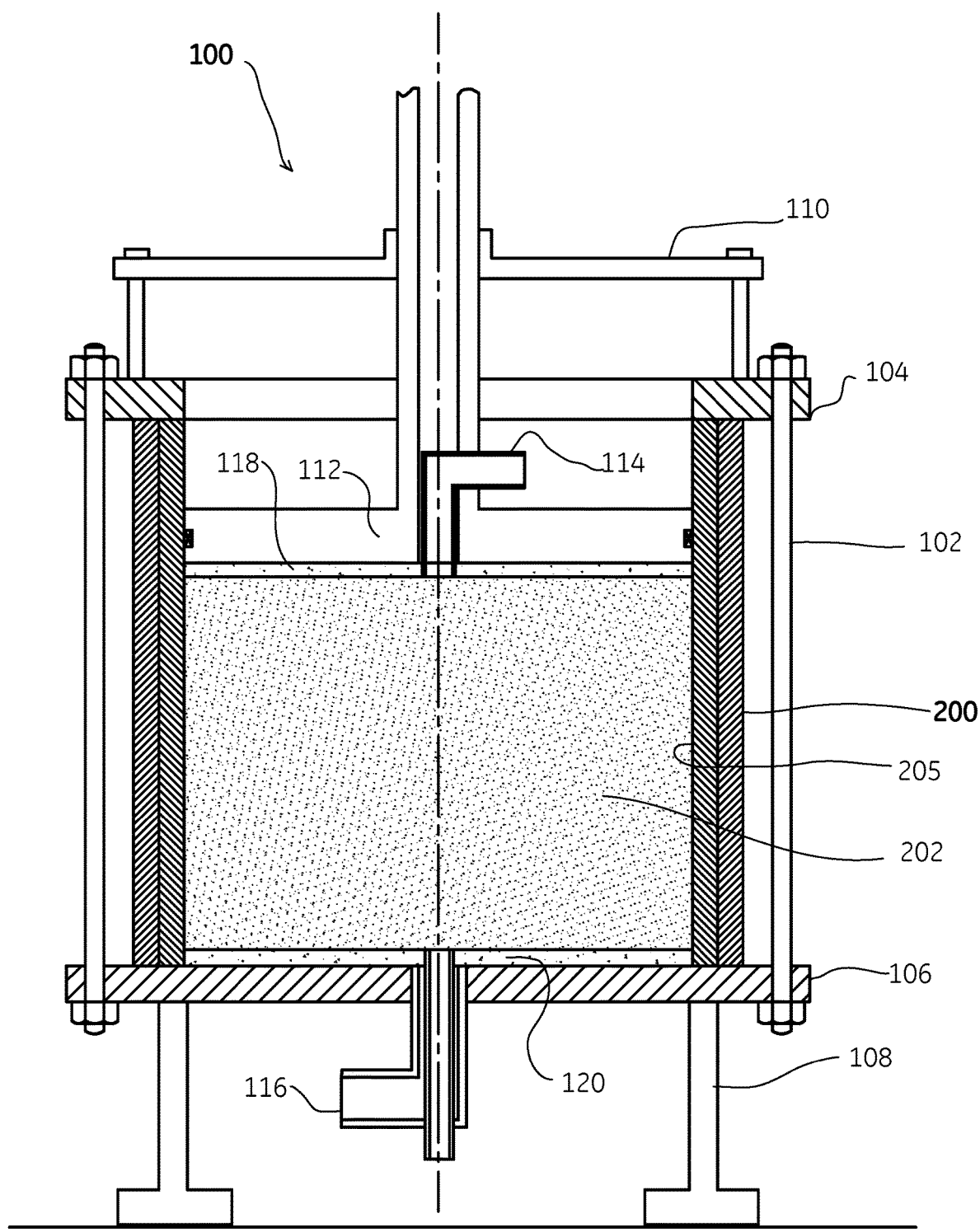
FIG. 1 shows a chromatography column assembly according to the invention.

FIG. 1 shows a section through chromatography column assembly 100, comprising a column cylinder 200 defining a media volume 202, here of about 10-40 liter capacity, the cylinder being clamped between an upper end plate 104, and a lower end plate 106 by means of peripheral tensionable tie rods 102. The assembly 100 is supported by legs 108. The upper end plate includes an adapter support 110 which in turn slidably supports an adapter plate 112. The adapter plate 112 and the lower plate each include a port arrangement 114 and 116 respectively, for allowing both the transfer of porous media into and out of the volume, as well as for allowing an analyte suspension to be loaded into the volume and for separated analytes to be removed from the volume. Top and bottom filters 118 and 120 contain separation media in the media volume 202 in use. The inner surface 205 of the cylinder 200 is intended to be in direct contact with media or cleaning materials contained in the volume 202. Other than the construction of the column cylinder 200, the arrangement described in this paragraph is conventional.

The column cylinder 200 is shown in more detail in FIG. 2 and includes an inner layer formed from a tube of polypropylene (PP) 210 and an outer layer formed from a PMMA polymer 220 formed directly onto the inner PP tube 210 by means of overlaying the inner tube 210 with a methyl methacrylate liquid resin and polymerizing the same using a catalyst such as an organic peroxide, for example methyl ethyl ketone peroxide (MEKP) dissolved in dimethyl phthalate, cyclohexane peroxide, or diallyl phthalate. Thereby, a single component, two-layer construction is formed which has no gaps or voids between the layers. The slight shrinkage of the PMMA when it polymerises adds to the mechanical bond between the inner layer 210 and outer layer 220. This composite construction is then used in a chromatography column assembly, for example as shown in FIG. 1.

FIG. 2a shows an end view of the cylinder shown in FIG. 2. Since the outer tube 220 is formed directly onto the inner tube 210, then the boundary 215 between the two tubes has no gaps or voids, and there is a bonding between the two tubes such that the outer tube supports the inner tube in use when the volume 202 is pressurized, and even when the volume 202 has negative pressure.

FIG. 2b shows an alternative construction for the cylinder, where the inner tube 210 is made as a sliding fit inside the outer tube 220, and adhesive 212, for example epoxy or polyurethane based adhesive is used to bond together the inner and outer tubes such that the outer tube 220 supports the inner tube in use when the volume 202 is pressurized, and even when the volume 202 has negative pressure.

FIG. 2c shows complementary axially extending protrusions 214 formed on the inner tube 210 and the outer tube 220, in this case matching dovetail formations 214, which allow the outer tube 220 to slide relative to the inner tube 210 and which provide support for the inner tube in use when the volume 202 is pressurized, and even when the volume 202 has negative pressure. The protrusions 214 could be other interlocking shapes but need not interlock. Also, the protrusions could run in an annulus around the inner tube 210, or helically. Even discrete protrusions such as mushroom shaped protrusions would suffice. In cases where the outer tube 220 cannot slide or twist onto the inner tube 210 because of the shape of the protrusions, then the outer tube 220 can be molded over the inner tube.

FIG. 2d shows the simplest construction, where the inner 210 and outer 220 tubes are formed as a sliding fit, whereby a slight gap 216 is formed where between, which gap can in use be sealed at the ends of the cylinder, such that the inner tube 210 cannot collapse under negative pressure because the volume of the gap 216 is sealed and cannot change substantially. So, in practice the outer tube 220 still supports the inner tube 210, albeit resiliently if the sealed gap 216 contains a gas. The gap can be filled with a liquid or a solid interlayer.

FIG. 3 illustrates one method of forming the cylinder 200, where a mold 300 is used. The mold 300 is shown in section in FIG. 3, and has two identical complementary semi-cylindrical female mating parts 310 and 312 each having an inner polished semi-cylindrical wall 314 and 316, when closed together forming a closed female cavity held in register by pins 306. The cavity is closed on its inner side by the PP tube 210, which can be formed for example by extrusion, or by fabricating a tube from a sheet of PP which has been heat softened and rolled into a tube, then joined by heat fusion along a seam where two opposed sides of the now rolled sheet meet. The tube 210 could also be made by injection molding or rotational molding in a female mold which has inserts, which techniques are useful if the tube 210 were to employ protrusions of the type 214 illustrated in FIG. 2c and described above. The mold cavity 320 is filled with PMMA resin mixed with the polymerization catalyst by pouring the resin into a sprue 302 until it emerges from a riser 304. Once set the mold can be disassembled and the now filled cavity 320 forms the outer tube 220 of the column cylinder 200. Any molding marks or flash is polished out, leaving a polished transparent outer layer and a translucent inner layer which still allows a visual confirmation of the chromatographic progress. This technique allows the outer layer 220 to be molded directly onto the outer surface of the inner layer 210, thus avoiding any gaps between the two layers where contamination could gather.

The cylinder 200 constructed as described above has the mechanical strength of acrylic polymer, and the enhanced chemical resistance of PP. The cost of the construction is not significantly more than PMMA alone, and there are no additional manufacturing steps other than the formation of the PP inner tube 210, which if made by extrusion, is not costly. The cylinder, in some procedures can be subjected to both positive and negative (vacuum) pressure as mentioned above. The lack of any unsealed space between the inner 210 and outer 220 tubes means that the inner tube is not collapsed by vacuum, but is mechanically supported by the outer tube 220 even in a vacuum condition in the volume 202.

The invention is not to be seen as limited by the embodiments described above, but can be varied within the scope of the appended claims as is readily apparent to a person skilled in the art. For instance, the focus of the embodiments is to provide a mechanically strong outer layer and a chemically resistant inner layer, without undue costs, and with the inner layer being supported in use by the outer layer in both positive and negative pressure situations. As described above, this could be achieved where one tube is overlaid, adhered to or mechanically interconnected to the other, for example so that no gaps between the two tubes are present (maintaining cleanability), and such constructions could be achieved using other materials. For the outer tube: PMMA or PMMA modified with additional comonomers such as butyl acrylate and/or methacylic acid and/or plasticisers; polycarbonate or high density polystyrene, are possible polymers. For the inner layer; PP; PVC; HDPE; PA; PTFE; PET; PEEK, polymers could be used. Of course, combinations of those material could be employed also, the choice depending on the known resistance characteristics of the inner layer and the intended liquids to be use during a chromatographic process. A PMMA outer layer with a PP inner layer is the preferred option because this combination has been found to be disposed to further processing operations, such as sterilization by means of Gamma irradiation, without significant changes to the material properties of the polymers used.

Whilst circular cylinders and illustrated and preferred, other shapes could be used to good effect, such as triangular, square or hexagonal sections. The construction of the chromatographic column assembly could be different to that illustrated in FIG. 1, to suit different column packing techniques.

Resin molding of the outer layer in a female mold directly onto the inner layer has been described as one way to form the column cylinder as a single component, but other resin molding methods of construction could be employed. For example, settable resin could be poured over a rotating inner layer and allowed to set while the rotation of the inner layer continues, thus negating the need for an outer mold. The inner layer could be formed onto the previously molded outer layer by molding the inner layer inside the outer layer, for example by continuously rotating the outer layer and heating it, whilst powdered or granular polymer is fed inside the outer layer. The heat from the outer layer will melt the powder or granules and a uniform layer will be formed inside the outer layer as it rotates. Cooling the outer layer will then set the inner layer onto the inside of the outer layer. Resin molding techniques could employ the formations 214 in the inner layer 210 as described above.

As illustrated, the thicknesses of the cylinder tube layers 210 and 220 should be approximately equal, but it is possible to make the inner tube thinner than the outer tube so that the overall transparency of the cylinder is improved, where the inner layer is normally translucent. In that way, the chemical resistance is not reduced and the strength of the cylinder is not reduced significantly.

Other additions, omissions, or variants will be apparent to the skilled addressee. Appended dependent claims are drafted to encompass multiple features in a single claim for legal conciseness and it is envisaged such features could be combined with other claims, removed or added to, without generalisation.

The invention claimed is:

1. A chromatography column cylinder formed from a polymer composite comprising an outer layer and an inner layer together defining a cylinder volume, the inner layer having an inner surface exposed to the volume, wherein the inner layer is supported by the outer layer, wherein the outer layer is formed from a polymer and is mechanically stronger than the inner layer of the cylinder, wherein the polymer comprises a polymethyl methacrylate or a polymethyl methacrylate modified with additional comonomers, and wherein polymerization of the polymer of the outer layer on the inner layer provides shrinkage of the outer layer to mechanically bond the outer layer to the inner layer.

2. The chromatography column cylinder as claimed in claim 1, wherein said inner layer support by the outer layer in use is provided by one or more of:
   a) directly molding one of said layers onto a surface of the other layer;
   b) adhering the inner and outer layers together;
   c) complementary formations of the inner and outer layers; or
   d) a sealed volume between the inner and outer layers.

3. The chromatography column cylinder as claimed in claim 1, wherein—the inner layer comprises polypropylene, polyvinyl chloride, high-density polyethylene, polyamide, polyethylene terephthalate, polyether ether ketone, or combinations thereof.

4. The chromatography column cylinder as claimed in claim 1, wherein the inner layer is formed as a tube, and the outer layer is overlaid onto the inner layer by means of resin molding around the inner layer.

5. The chromatography column cylinder as claimed in claim 1, wherein the cylinder is a right circular cylinder, or a polygonal cylinder.

6. A chromatography column assembly including a chromatographic column cylinder as claimed in claim 1.

7. The chromatography column cylinder as claimed in claim 1, wherein the outer layer consists essentially of a polymethyl methacrylate polymer, and the inner layer consists essentially of a polypropylene polymer.

8. A method for forming a chromatography column cylinder, comprising forming a polymer cylinder as claimed in claim 1.

9. The method as claimed in claim 8 including any one or more of the steps of:
   a) molding one of the layers directly onto the other layer;
   b) adhering the inner and outer layers together;
   c) forming complementary formations on the inner and outer layers and joining said layers using said complementary formations; and
   d) providing a sealed volume between the inner and outer layers, in each case to provide said support.

10. The method as claimed in claim 8, wherein the material of the inner layer is formed from a relatively more chemically resistant polymer material than the outer layer, and the outer layer is formed from a material which renders the outer layer relatively mechanically stronger than the inner layer.

11. The method as claimed in claim 8, wherein the inner layer comprises polypropylene, polyvinyl chloride, high-density polyethylene, polyamide, polytetrafluoroethylene, polyethylene terephthalate, polyether ether ketone, or combinations thereof.

12. The method as claimed in claim 8, wherein the inner layer is formed as a tube and the outer layer is molded directly onto the outer surface of the inner layer.

13. The method as claimed in claim 8, wherein the outer layer is formed as a tube and the inner layer is molded directly onto the inner wall of the outer layer.

\* \* \* \* \*